UNITED STATES PATENT OFFICE.

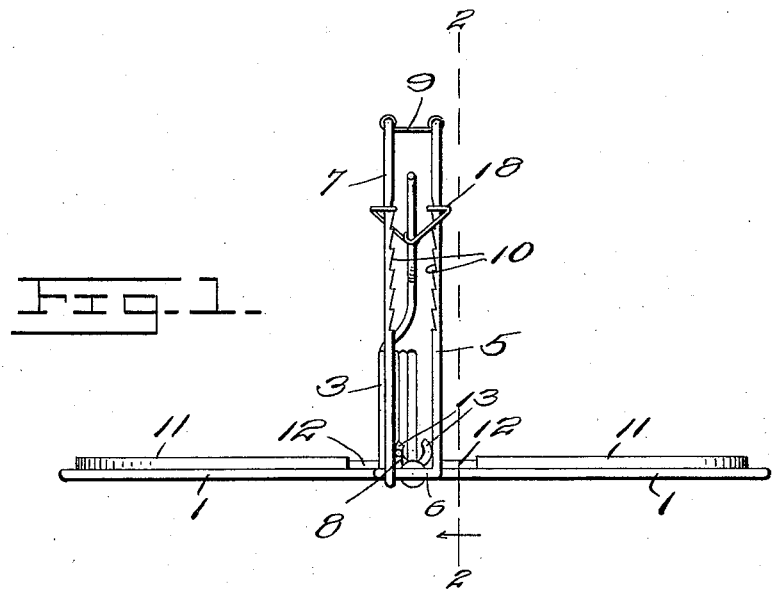
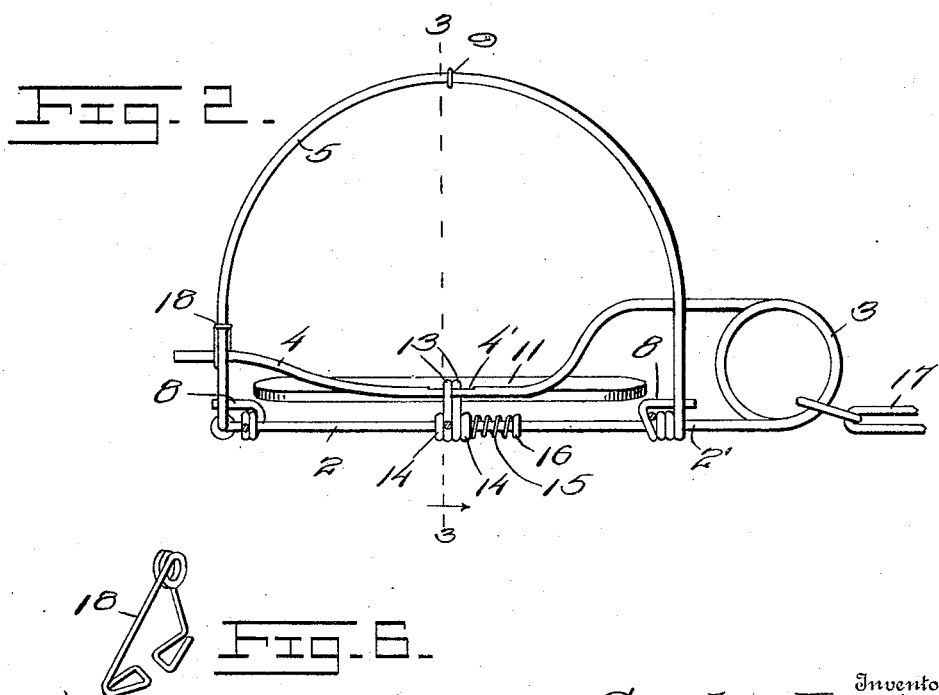

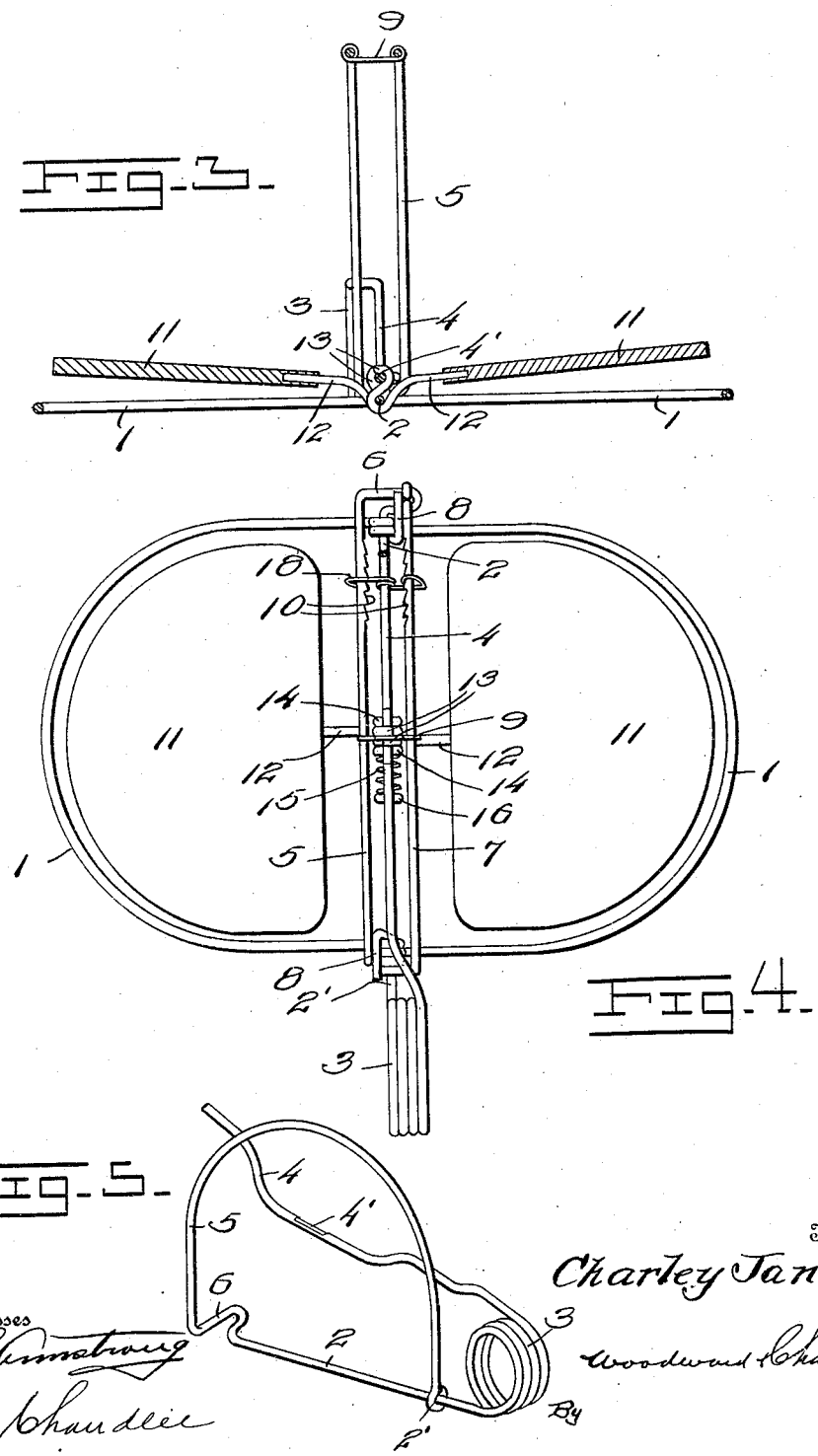

CHARLEY JANKE, OF MEADOW GROVE, NEBRASKA.

TRAP.

940,877. Specification of Letters Patent. Patented Nov. 23, 1909.

Application filed April 21, 1909. Serial No. 491,214.

*To all whom it may concern:*

Be it known that I, CHARLEY JANKE, a citizen of the United States, residing at Meadow Grove, in the county of Madison and State of Nebraska, have invented certain new and useful Improvements in Traps, of which the following is a specification.

This invention relates to traps, and more particularly to animal traps such as are used for trapping rabbits, squirrels, beavers and other small animals.

The object of my invention is to provide a trap of this character entirely constructed of steel wire.

Another object is to provide new and novel means by which the trap is sprung at the proper time for securely holding the animal therein.

A further object is to provide trigger plates which when the trap is set will securely retain their adjusted positions at all times except when an animal of considerable weight steps upon said plate.

A still further object is to provide suitable means also constructed of wire to support said trap upon the ground.

With these and other objects in view the present invention consists in the combination and arrangement of parts, as will be hereinafter more fully described and more particularly pointed out in the appended claims, it being understood that changes in the specific structure shown and described may be made within the scope of the claims, without departing from the spirit of the invention.

In the drawings forming a part of this specification, and in which like numerals of reference indicate similar parts in the several views, Figure 1 is a side elevation of my improved trap, Fig. 2 is a vertical section showing the trap set. Fig. 3 is a section taken on line 3—3 of Fig. 2, Fig. 4 is a top plan view, Fig. 5 is a perspective view of the spring actuated bar and the bowed members. Fig. 6 is a detailed view of the member, which prevents the lowering of the spring bar.

Referring to the drawings, 1 indicates the oppositely disposed, substantially semi-circular supports which are preferably formed of steel wire of suitable weight and thickness and have their ends secured around the wire 2, a portion of which is horizontally disposed as at 2' and may be termed the base of the trap. This wire is coiled intermediate of its ends to provide a spring 3 and has its end 4 bent downwardly and extended in horizontal relation to the base portion thereof. The other end of the wire is bowed as at 5 and is secured to the portion 2' adjacent to the spring 3. At the other end of the bowed portion 5, the wire 2 is laterally bent as shown at 6 to provide means for securing one end of a bowed wire 7, which is disposed in parallel relation to the bow 5 and has its other end secured to the wire 2 in close proximity to the attached end thereof. The ends of the wire supports 1 are also secured to the wire 2 and one of said ends which are located adjacent to the attached ends of the bowed wires 5 and 7, are horizontally extended and project between the same as shown at 8, thus providing an additional means of support. A link 9 connects the bowed wires which are formed with the opposed racks, the purpose of which will be later described.

Trigger plates 11 are located within the supporting members 1 and are provided with the short inwardly extending wires 12 which surround the wire 2 and are formed with the hooked ends 13 which engage the flattened surface 4' of the end 4 when the trap is set. The wires 12 are disposed between the collars 14 one of which is firmly secured upon the wire 2, the other being held in frictional engagement with wires 12 by a spring 15 surrounding the wire 2 and held in position thereon by the collar 14 and another collar 16 suitably spaced therefrom. By this means the trigger plates are frictionally sustained at any point between the set and unset positions, thus compensating for any wear upon the parts. A chain 17 may be secured in the coiled portion of the wire 2 and the opposite end secured to a tree stump, thus preventing the trapped animal from dragging the trap.

In operation the wires 12 have their ends 13 engaged over the flat portion 4' of the wire 2, thus holding the end 4 in position against the tension of the spring 3. The trap thus set is placed in position and may be suitably baited if desired, though not essential to the operation of the device. The animal in passing beneath the bowed sections of the wire will tread upon one of the trigger plates which will disengage the end 13 of the wire 12 from the spring bar 4. The bar 4 however, will not be released until the fore-feet of the animal depress the other of the trigger plates, when the bar 4 will be released and sprung upward with great force by means of the spring 3. The animal will thus be securely held between the bar 4 and the bowed members 5 and 7. A wire 18 is coiled around the end 4 of the wire 2 and has its ends loosely surrounding the bowed wires 5 and 7, which are adapted to engage the racked portions 10 thereof. Should it be desired to trap animals of considerable strength, the racked surfaces of the bowed members will prevent any downward movement of the bar 4, which might be occasioned by the struggles of the animal. It will be noted that the wire 2 forms the base rod 2', the spring 3, the bar 4 and the bowed members 5. This forms a very strong and rigid construction and one from which the animal will have no chance to escape by the breaking of the parts as has heretofore been the case. The animal may be readily released by bearing down upon the protruding end of the member 4.

From the foregoing it will be seen that I have provided a trap which can be very quickly set, is absolutely positive in its operation and which is not liable to get out of order. It is moreover very light and simply constructed and instantaneously operated.

And having thus described my said invention, what I claim as new and desire to secure by United States Letters Patent is:—

1. A trap of the class described comprising a spring member having one of its ends horizontally extended and vertically bowed, a coil formed by said spring member intermediate the ends thereof, a second bowed member secured to said spring member and disposed in parallel relation to the bowed portion thereof, the other end of said spring member being horizontally extended and having its end downwardly bent, said end being disposed between the bowed members, and trigger plates secured upon the horizontal portion of said spring member on either side thereof and adapted to maintain the free end of said member in parallel relation thereto, and means for supporting said trap in position.

2. A trap of the character described comprising a spring member having one of its ends horizontally extended and upwardly bowed, a coil formed intermediate of the ends of said member, a second bowed member secured to said spring member in spaced parallel relation to the bowed portion thereof, a link connecting said bowed members, the other end of said spring member being horizontally disposed and downwardly bent to form a catch bar, said end projecting between said bowed members, said bar having a portion of its upper surface flattened, means for retaining said bar between said bowed members, supports disposed upon either side of said bowed members and having their ends projecting between said bowed members, trigger plates frictionally engaged upon the horizontal portion of said spring member and disposed within said support, hooked ends upon said trigger plates adapted to engage the flat portion of the spring bar and retain the same in parallel relation to the horizontal portion of said spring member, substantially as and for the purpose set forth.

3. A trap of the character described comprising a spring member coiled between its ends, one of said ends being horizontally and laterally extended, said lateral extension being formed into an upwardly extending bowed member having its end secured to the horizontal portion thereof, a second bow member secured to said spring member, means for holding said bow members in spaced parallel relation, said bowed members having their opposed faces provided with teeth, a wire secured to said spring member having its ends secured to said bowed members and adapted to engage with the toothed portion thereof, supports disposed from the horizontal portion of said spring member, trigger plates having wires secured to their opposed ends, said wires frictionally engaged by collars disposed upon said spring member, a coil spring disposed upon the horizontal portion of said member and adapted to maintain one of said collars in constant frictional engagement with the wires of said trigger plate, said wires having hooked upper ends, which are adapted to engage with the horizontally disposed end of said spring member, substantially as and for the purpose set forth.

4. A trap of the character described comprising a spring formed of a single length of steel wire coiled between its ends, the ends of said wire being disposed in parallel relation, one of said ends forming in effect a spring bar, wire supporting members secured to said spring members and projecting at right angles thereto, trigger plates provided with wire extensions, means for maintaining the trigger plates in frictional engagement upon said spring member, said wire having hooked upper ends engaging with the spring bar of said coiled spring, substantially as and for the purpose set forth.

5. In a trap, the combination with a U-shaped member having a bight portion, a reciprocable member integrally formed with the U-shaped member, means for forcing the reciprocable member toward the bight portion, and means for locking said members in engaged position against the bight portion.

In testimony whereof I affix my signature, in presence of two witnesses.

CHARLEY JANKE.

Witnesses:
  HENRY STOLTENBERG,
  R. E. SIMMONS.